US007623935B2

(12) United States Patent
Cohen et al.

(10) Patent No.: US 7,623,935 B2
(45) Date of Patent: *Nov. 24, 2009

(54) METHOD FOR ELECTROCHEMICALLY FABRICATING THREE-DIMENSIONAL STRUCTURES INCLUDING PSEUDO-RASTERIZATION OF DATA

(75) Inventors: Adam L. Cohen, Los Angeles, CA (US); Jeffrey A. Thompson, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 584 days.

This patent is subject to a terminal disclaimer.

(21) Appl. No.: 11/029,173

(22) Filed: Jan. 3, 2005

(65) Prior Publication Data

US 2006/0084265 A1    Apr. 20, 2006

Related U.S. Application Data

(60) Provisional application No. 60/534,156, filed on Dec. 31, 2003.

(51) Int. Cl.
   G06F 17/50    (2006.01)
   G06F 19/00    (2006.01)
(52) U.S. Cl. .................. 700/95; 700/119; 700/121; 430/5; 378/35; 438/607; 438/669; 438/761
(58) Field of Classification Search .................. 700/98, 700/119–121, 123, 182; 264/401, 113, 494; 264/497; 438/53, 14, 607, 669, 761; 716/20–21; 333/117; 205/118; 430/5; 378/35
See application file for complete search history.

(56) References Cited

U.S. PATENT DOCUMENTS

| 5,137,662 A * | 8/1992 | Hull et al. ............. 264/401 |
| 5,182,055 A | 1/1993 | Allison et al. ............ 264/401 |
| 5,184,306 A | 2/1993 | Erdman et al. ............ 700/163 |

(Continued)

OTHER PUBLICATIONS

Cohen, et al., "EFAB: Batch Production of Functional, Fully-Dense Metal Parts with Micron-Scale Features", Proc. 9th Solid Freeform Fabrication, The University of Texas at Austin, Aug. 1998, pp. 161.

(Continued)

*Primary Examiner*—Kidest Bahta
(74) *Attorney, Agent, or Firm*—Dennis R. Smalley

(57) ABSTRACT

Some embodiments of the invention are directed to techniques for electrochemically fabricating multi-layer three-dimensional structures where selective patterning of at least one or more layers occurs via a mask which is formed using data representing cross-sections of the three-dimensional structure which has been modified to place it in a polygonal form which defines only regions of positive area. The regions of positive area are regions where structural material is to be located or regions where structural material is not to be located depending on whether the mask will be used, for example, in selectively depositing a structural material or a sacrificial material. The modified data may take the form of adjacent or slightly overlapped relative narrow rectangular structures where the width of the structures is related to a desired formation resolution. The spacing between centers of adjacent rectangles may be uniform or may be a variable. The data modification may also include the formation of duplicate copies of an original structure, scaled copies, mirrored copies, rotated copies, complementary copies, and the like.

22 Claims, 11 Drawing Sheets

U.S. PATENT DOCUMENTS

| | | | | |
|---|---|---|---|---|
| 5,190,637 | A | 3/1993 | Guckel | 205/118 |
| 5,216,616 | A | 6/1993 | Masters | 264/401 |
| 5,321,622 | A | 6/1994 | Snead et al. | 700/182 |
| 5,430,666 | A | 7/1995 | DeAngelis et al. | 250/491.1 |
| 6,027,630 | A * | 2/2000 | Cohen | 205/135 |
| 6,029,096 | A | 2/2000 | Manners et al. | 700/120 |
| 6,084,980 | A | 7/2000 | Nguyen et al. | 382/154 |
| 6,333,741 | B1 | 12/2001 | Snead et al. | 345/423 |
| 6,366,825 | B1 | 4/2002 | Smalley et al. | 700/120 |
| 6,600,965 | B1 * | 7/2003 | Hull et al. | 700/120 |
| 7,430,731 | B2 | 9/2008 | Cohen et al. | 716/21 |
| 2002/0093115 | A1 * | 7/2002 | Jang et al. | 264/113 |
| 2002/0149137 | A1 * | 10/2002 | Jang et al. | 264/494 |
| 2003/0027363 | A1 * | 2/2003 | Kodama | 438/14 |
| 2003/0215664 | A1 * | 11/2003 | Morales et al. | 428/596 |
| 2004/0140862 | A1 * | 7/2004 | Brown et al. | 333/117 |
| 2004/0251581 | A1 * | 12/2004 | Jang et al. | 264/497 |
| 2005/0202665 | A1 * | 9/2005 | Namba et al. | 438/607 |
| 2005/0221529 | A1 * | 10/2005 | Bang et al. | 438/53 |
| 2006/0084265 | A1 * | 4/2006 | Cohen et al. | 438/670 |
| 2007/0111498 | A1 * | 5/2007 | Nambo et al. | 438/607 |

OTHER PUBLICATIONS

Adam L. Cohen, et al., "EFAB: Rapid, Low-Cost Desktop Micromachining of High Aspect Ratio True 3-D MEMS", Proc. 12th IEEE Micro Electro Mechanical Systems Workshop, IEEE, Jan. 17-21, 1999, pp. 244-251.

"Microfabrication—Rapid Prototyping's Killer Application", Rapid Prototyping Report, CAD/CAM Publishing, Inc., Jun. 1999, pp. 1-5.

Adam L. Cohen, "3-D Micromachining by Electrochemical Fabrication", Micromachine Devices, Mar. 1999, pp. 6-7.

Gang Zhang, et al., "EFAB: Rapid Desktop Manufacturing of True 3-D Microstructures", Proc. 2nd International Conference on Integrated MicroNanotechnology for Space Applications, The Aerospace Co., Apr. 1999.

F. Tseng, et al., "EFAB: High Aspect Ratio, Arbitrary 3-D Metal Microstructures Using a Low-Cost Automated Batch Process", 3rd International Workshop on High Aspect Ratio Microstructure Technology (HARMST'99), Jun. 1999.

Adam L. Cohen, et al., "EFAB: Low-Cost, Automated Electrochemical Batch Fabrication of Arbitrary 3-D Microstructures", Micromachining and Microfabrication Process Technology, SPIE 1999 Symposium on Micromachining and Microfabrication, Sep. 1999.

F. Tseng, et al., "EFAB: High Aspect Ratio, Arbitrary 3-D Metal Microstructures Using a Low-Cost Automated Batch Process", MEMS Symposium, ASME 1999 International Mechanical Engineering Congress and Exposition, Nov. 1999.

Adam L. Cohen, "Electrochemical Fabrication (EFABTM)", Chapter 19 of the MEMS Handbook, edited by Mohamed Gad-El-Hak, CRC Press, 2002, pp. 19/1-19/23.

* cited by examiner

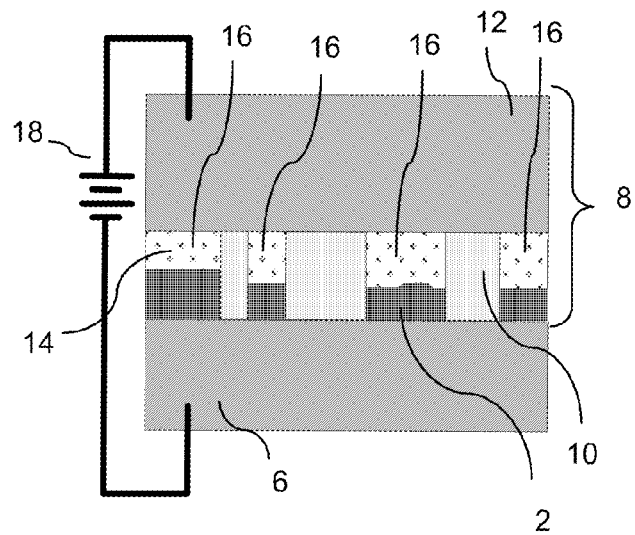
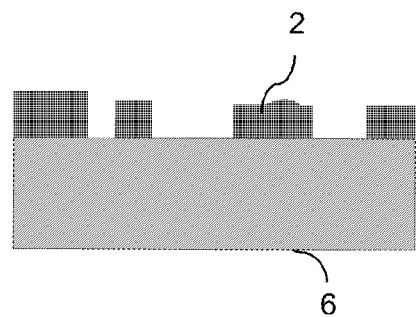
FIG 2A
(PRIOR ART)
FIG 2B
(PRIOR ART)
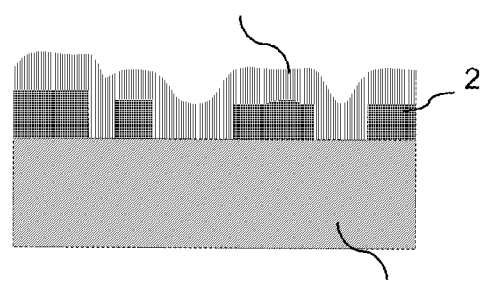
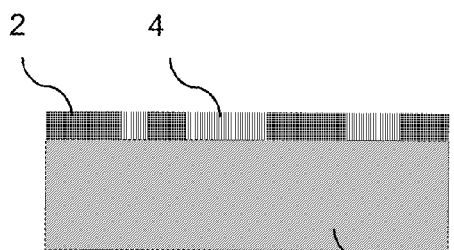
FIG 2C
(PRIOR ART)
FIG 2D
(PRIOR ART)
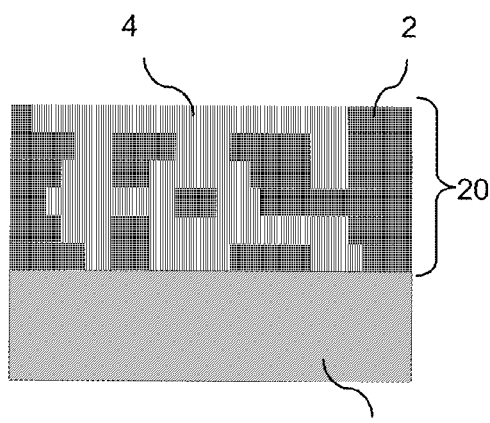
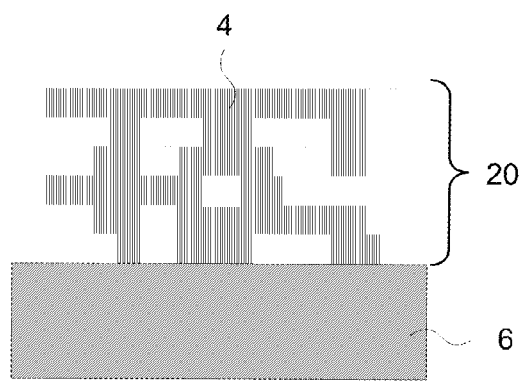
FIG 2E
(PRIOR ART)
FIG 2F
(PRIOR ART)

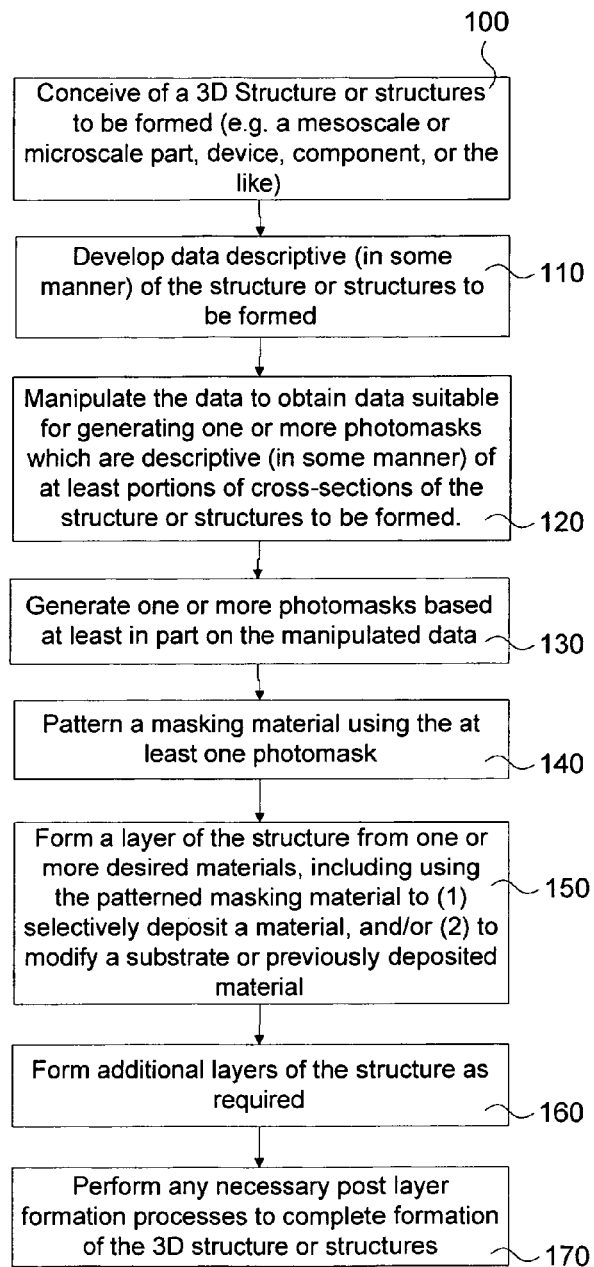
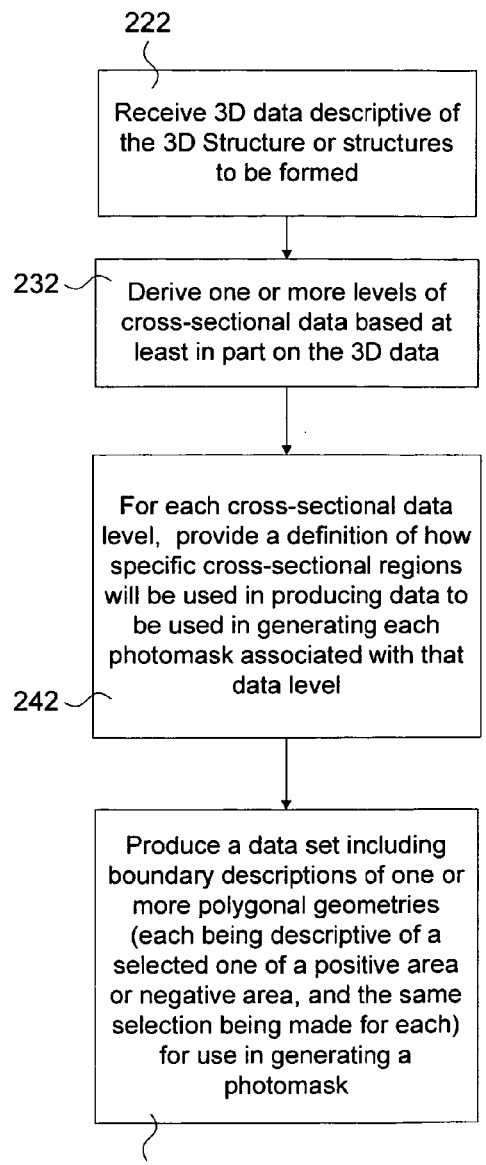
FIG 5
FIG 6

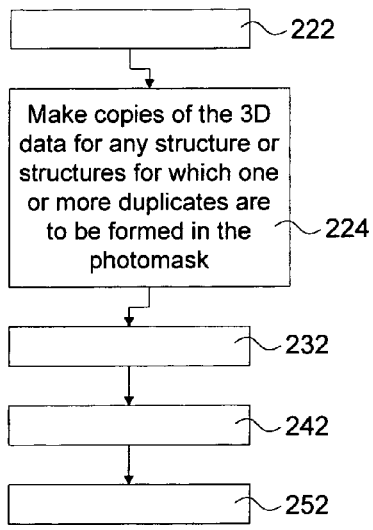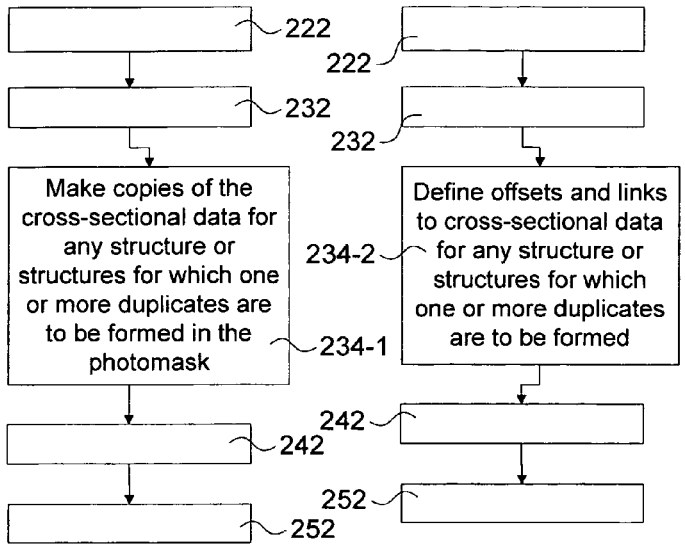
FIG 7A  FIG 7B  FIG 7C
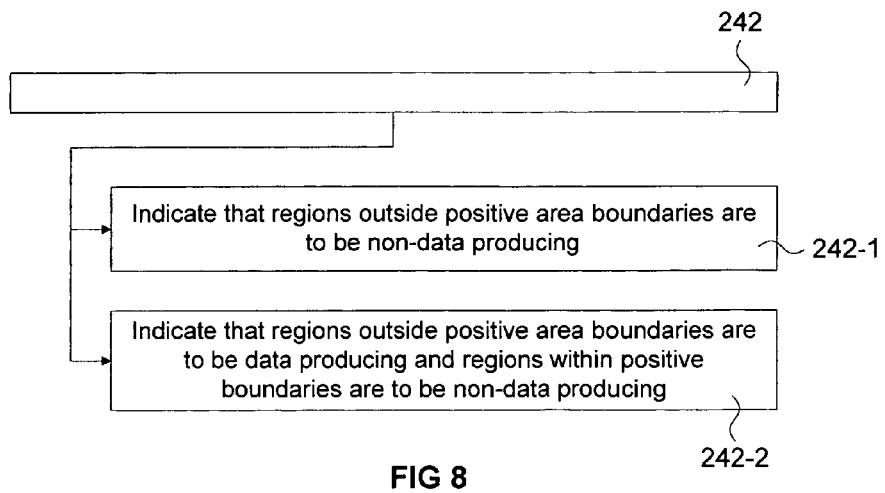
FIG 8

US 7,623,935 B2

METHOD FOR ELECTROCHEMICALLY FABRICATING THREE-DIMENSIONAL STRUCTURES INCLUDING PSEUDO-RASTERIZATION OF DATA

RELATED APPLICATION DATA

This application claims benefit of U.S. Provisional Patent Application No. 60/534,156, filed Dec. 31, 2003. This referenced application is incorporated herein by reference.

US GOVERNMENT RIGHTS

A portion of the inventions disclosed herein were made with US Government support under DARPA Grants DABT63-97-C-0051 and DABT63-99-C-0042. The Government has certain rights. Not all inventions disclosed herein were developed or conceived of with Government funding and it is not intended that the Government attain rights in such inventions.

FIELD OF THE INVENTION

Embodiments of the present invention relate generally to the field of electrochemical fabrication and the associated formation of three-dimensional structures (e.g. microscale or mesoscale structures). In particular, some embodiments of the invention relate to manipulations of data representing one or more three-dimensional structures to derive cross-sectional data that includes boundaries that define regions of positive areas only and more particularly some embodiments are directed to deriving such data where the data takes the form of a plurality of adjacent and similarly oriented, elongated rectangular structures.

BACKGROUND OF THE INVENTION

A technique for forming three-dimensional structures (e.g. parts, components, devices, and the like) from a plurality of adhered layers was invented by Adam L. Cohen and is known as Electrochemical Fabrication. It is being commercially pursued by Microfabrica Inc. (formerly MEMGen® Corporation) of Burbank, Calif. under the name EFAB™. This technique was described in U.S. Pat. No. 6,027,630, issued on Feb. 22, 2000. This electrochemical deposition technique allows the selective deposition of a material using a unique masking technique that involves the use of a mask that includes patterned conformable material on a support structure that is independent of the substrate onto which plating will occur. When desiring to perform an electrodeposition using the mask, the conformable portion of the mask is brought into contact with a substrate while in the presence of a plating solution such that the contact of the conformable portion of the mask to the substrate inhibits deposition at selected locations. For convenience, these masks might be generically called conformable contact masks; the masking technique may be generically called a conformable contact mask plating process. More specifically, in the terminology of Microfabrica Inc. (formerly MEMGen® Corporation) of Burbank, Calif. such masks have come to be known as INSTANT MASKS™ and the process known as INSTANT MASKING™ or INSTANT MASK™ plating. Selective depositions using conformable contact mask plating may be used to form single layers of material or may be used to form multi-layer structures. The teachings of the '630 patent are hereby incorporated herein by reference as if set forth in full herein. Since the filing of the patent application that led to the above noted patent, various papers about conformable contact mask plating (i.e. INSTANT MASKING) and electrochemical fabrication have been published:

(1) A. Cohen, G. Zhang, F. Tseng, F. Mansfeld, U. Frodis and P. Will, "EFAB: Batch production of functional, fully-dense metal parts with micro-scale features", Proc. 9th Solid Freeform Fabrication, The University of Texas at Austin, p 161, August 1998.

(2) A. Cohen, G. Zhang, F. Tseng, F. Mansfeld, U. Frodis and P. Will, "EFAB: Rapid, Low-Cost Desktop Micromachining of High Aspect Ratio True 3-D MEMS", Proc. 12th IEEE Micro Electro Mechanical Systems Workshop, IEEE, p244, January 1999.

(3) A. Cohen, "3-D Micromachining by Electrochemical Fabrication", Micromachine Devices, March 1999.

(4) G. Zhang, A. Cohen, U. Frodis, F. Tseng, F. Mansfeld, and P. Will, "EFAB: Rapid Desktop Manufacturing of True 3-D Microstructures", Proc. 2nd International Conference on Integrated MicroNanotechnology for Space Applications, The Aerospace Co., April 1999.

(5) F. Tseng, U. Frodis, G. Zhang, A. Cohen, F. Mansfeld, and P. Will, "EFAB: High Aspect Ratio, Arbitrary 3-D Metal Microstructures using a Low-Cost Automated Batch Process", 3rd International Workshop on High Aspect Ratio MicroStructure Technology (HARMST'99), June 1999.

(6) A. Cohen, U. Frodis, F. Tseng, G. Zhang, F. Mansfeld, and P. Will, "EFAB: Low-Cost, Automated Electrochemical Batch Fabrication of Arbitrary 3-D Microstructures", Micromachining and Microfabrication Process Technology, SPIE 1999 Symposium on Micromachining and Microfabrication, September 1999.

(7) F. Tseng, G. Zhang, U. Frodis, A. Cohen, F. Mansfeld, and P. Will, "EFAB: High Aspect Ratio, Arbitrary 3-D Metal Microstructures using a Low-Cost Automated Batch Process", MEMS Symposium, ASME 1999 International Mechanical Engineering Congress and Exposition, November, 1999.

(8) A. Cohen, "Electrochemical Fabrication (EFABTM)", Chapter 19 of The MEMS Handbook, edited by Mohamed Gad-EI-Hak, CRC Press, 2002.

(9) Microfabrication—Rapid Prototyping's Killer Application", pages 1-5 of the Rapid Prototyping Report, CAD/CAM Publishing, Inc., June 1999.

The disclosures of these nine publications are hereby incorporated herein by reference as if set forth in full herein.

The electrochemical deposition process may be carried out in a number of different ways as set forth in the above patent and publications. In one form, this process involves the execution of three separate operations during the formation of each layer of the structure that is to be formed:

1. Selectively depositing at least one material by electrodeposition upon one or more desired regions of a substrate.

2. Then, blanket depositing at least one additional material by electrodeposition so that the additional deposit covers both the regions that were previously selectively deposited onto, and the regions of the substrate that did not receive any previously applied selective depositions.

3. Finally, planarizing the materials deposited during the first and second operations to produce a smoothed surface of a first layer of desired thickness having at least one region containing the at least one material and at least one region containing at least the one additional material.

After formation of the first layer, one or more additional layers may be formed adjacent to the immediately preceding layer and adhered to the smoothed surface of that preceding layer. These additional layers are formed by repeating the first through third operations one or more times wherein the formation of each subsequent layer treats the previously formed layers and the initial substrate as a new and thickening substrate.

Once the formation of all layers has been completed, at least a portion of at least one of the materials deposited is generally removed by an etching process to expose or release the three-dimensional structure that was intended to be formed.

The preferred method of performing the selective electrodeposition involved in the first operation is by conformable contact mask plating. In this type of plating, one or more conformable contact (CC) masks are first formed. The CC masks include a support structure onto which a patterned conformable dielectric material is adhered or formed. The conformable material for each mask is shaped in accordance with a particular cross-section of material to be plated. At least one CC mask is needed for each unique cross-sectional pattern that is to be plated.

The support for a CC mask is typically a plate-like structure formed of a metal that is to be selectively electroplated and from which material to be plated will be dissolved. In this typical approach, the support will act as an anode in an electroplating process. In an alternative approach, the support may instead be a porous or otherwise perforated material through which deposition material will pass during an electroplating operation on its way from a distal anode to a deposition surface. In either approach, it is possible for CC masks to share a common support, i.e. the patterns of conformable dielectric material for plating multiple layers of material may be located in different areas of a single support structure. When a single support structure contains multiple plating patterns, the entire structure is referred to as the CC mask while the individual plating masks may be referred to as "submasks". In the present application such a distinction will be made only when relevant to a specific point being made.

In preparation for performing the selective deposition of the first operation, the conformable portion of the CC mask is placed in registration with and pressed against a selected portion of the substrate (or onto a previously formed layer or onto a previously deposited portion of a layer) on which deposition is to occur. The pressing together of the CC mask and substrate occur in such a way that all openings, in the conformable portions of the CC mask contain plating solution. The conformable material of the CC mask that contacts the substrate acts as a barrier to electrodeposition while the openings in the CC mask that are filled with electroplating solution act as pathways for transferring material from an anode (e.g. the CC mask support) to the non-contacted portions of the substrate (which act as a cathode during the plating operation) when an appropriate potential and/or current are supplied.

An example of a CC mask and CC mask plating are shown in FIGS. 1A-1C. FIG. 1A shows a side view of a CC mask 8 consisting of a conformable or deformable (e.g. elastomeric) insulator 10 patterned on an anode 12. The anode has two functions. FIG. 1A also depicts a substrate 6 separated from mask 8. One is as a supporting material for the patterned insulator 10 to maintain its integrity and alignment since the pattern may be topologically complex (e.g., involving isolated "islands" of insulator material). The other function is as an anode for the electroplating operation. CC mask plating selectively deposits material 22 onto a substrate 6 by simply pressing the insulator against the substrate then electrodepositing material through apertures 26a and 26b in the insulator as shown in FIG. 1B. After deposition, the CC mask is separated, preferably non-destructively, from the substrate 6 as shown in FIG. 1C. The CC mask plating process is distinct from a "through-mask" plating process in that in a through-mask plating process the separation of the masking material from the substrate would occur destructively. As with through-mask plating, CC mask plating deposits material selectively and simultaneously over the entire layer. The plated region may consist of one or more isolated plating regions where these isolated plating regions may belong to a single structure that is being formed or may belong to multiple structures that are being formed simultaneously. In CC mask plating as individual masks are not intentionally destroyed in the removal process, they may be usable in multiple plating operations.

Another example of a CC mask and CC mask plating is shown in FIGS. 1D-1F. FIG. 1D shows an anode 12' separated from a mask 8' that includes a patterned conformable material 10' and a support structure 20. FIG. 1D also depicts substrate 6 separated from the mask 8'. FIG. 1E illustrates the mask 8' being brought into contact with the substrate 6. FIG. 1F illustrates the deposit 22' that results from conducting a current from the anode 12' to the substrate 6. FIG. 1G illustrates the deposit 22' on substrate 6 after separation from mask 8'. In this example, an appropriate electrolyte is located between the substrate 6 and the anode 12' and a current of ions coming from one or both of the solution and the anode are conducted through the opening in the mask to the substrate where material is deposited. This type of mask may be referred to as an anodeless INSTANT MASK™ (AIM) or as an anodeless conformable contact (ACC) mask.

Unlike through-mask plating, CC mask plating allows CC masks to be formed completely separate from the fabrication of the substrate on which plating is to occur (e.g. separate from a three-dimensional (3D) structure that is being formed). CC masks may be formed in a variety of ways, for example, a photolithographic process may be used. All masks can be generated simultaneously, prior to structure fabrication rather than during it. This separation makes possible a simple, low-cost, automated, self-contained, and internally-clean "desktop factory" that can be installed almost anywhere to fabricate 3D structures, leaving any required clean room processes, such as photolithography to be performed by service bureaus or the like.

An example of the electrochemical fabrication process discussed above is illustrated in FIGS. 2A-2F. These figures show that the process involves deposition of a first material 2 which is a sacrificial material and a second material 4 which is a structural material. The CC mask 8, in this example, includes a patterned conformable material (e.g. an elastomeric dielectric material) 10 and a support 12 which is made from deposition material 2. The conformal portion of the CC mask is pressed against substrate 6 with a plating solution 14 located within the openings 16 in the conformable material 10. An electric current, from power supply 18, is then passed through the plating solution 14 via (a) support 12 which doubles as an anode and (b) substrate 6 which doubles as a cathode. FIG. 2A, illustrates that the passing of current causes material 2 within the plating solution and material 2 from the anode 12 to be selectively transferred to and plated on the cathode 6. After electroplating the first deposition material 2 onto the substrate 6 using CC mask 8, the CC mask 8 is removed as shown in FIG. 2B. FIG. 2C depicts the second deposition material 4 as having been blanket-deposited (i.e. non-selectively deposited) over the previously deposited first deposition material 2 as well as over the other portions of the substrate 6. The blanket deposition occurs by electroplating from an anode (not shown), composed of the second material, through an appropriate plating solution (not shown), and to the cathode/substrate 6. The entire two-material layer is then planarized to achieve precise thickness and flatness as shown in FIG. 2D. After repetition of this process for all layers, the multi-layer structure 20 formed of the second material 4 (i.e. structural material) is embedded in first material 2 (i.e. sacrificial material) as shown in FIG. 2E. The embedded structure is etched to yield the desired device, i.e. structure 20, as shown in FIG. 2F.

Various components of an exemplary manual electrochemical fabrication system 32 are shown in FIGS. 3A-3C. The system 32 consists of several subsystems 34, 36, 38, and 40. The substrate holding subsystem 34 is depicted in the upper portions of each of FIGS. 3A to 3C and includes several components: (1) a carrier 48, (2) a metal substrate 6 onto which the layers are deposited, and (3) a linear slide 42 capable of moving the substrate 6 up and down relative to the carrier 48 in response to drive force from actuator 44. Subsystem 34 also includes an indicator 46 for measuring differences in vertical position of the substrate which may be used in setting or determining layer thicknesses and/or deposition thicknesses. The subsystem 34 further includes feet 68 for carrier 48 which can be precisely mounted on subsystem 36.

The CC mask subsystem 36 shown in the lower portion of FIG. 3A includes several components: (1) a CC mask 8 that is actually made up of a number of CC masks (i.e. submasks) that share a common support/anode 12, (2) precision X-stage 54, (3) precision Y-stage 56, (4) frame 72 on which the feet 68 of subsystem 34 can mount, and (5) a tank 58 for containing the electrolyte 16. Subsystems 34 and 36 also include appropriate electrical connections (not shown) for connecting to an appropriate power source for driving the CC masking process.

The blanket deposition subsystem 38 is shown in the lower portion of FIG. 3B and includes several components: (1) an anode 62, (2) an electrolyte tank 64 for holding plating solution 66, and (3) frame 74 on which the feet 68 of subsystem 34 may sit. Subsystem 38 also includes appropriate electrical connections (not shown) for connecting the anode to an appropriate power supply for driving the blanket deposition process.

The planarization subsystem 40 is shown in the lower portion of FIG. 3C and includes a lapping plate 52 and associated motion and control systems (not shown) for planarizing the depositions.

Another method for forming microstructures from electroplated metals (i.e. using electrochemical fabrication techniques) is taught in U.S. Pat. No. 5,190,637 to Henry Guckel, entitled "Formation of Microstructures by Multiple Level Deep X-ray Lithography with Sacrificial Metal layers". This patent teaches the formation of metal structure utilizing mask exposures. A first layer of a primary metal is electroplated onto an exposed plating base to fill a void in a photoresist, the photoresist is then removed and a secondary metal is electroplated over the first layer and over the plating base. The exposed surface of the secondary metal is then machined down to a height which exposes the first metal to produce a flat uniform surface extending across the both the primary and secondary metals. Formation of a second layer may then begin by applying a photoresist layer over the first layer and then repeating the process used to produce the first layer. The process is then repeated until the entire structure is formed and the secondary metal is removed by etching. The photoresist is formed over the plating base or previous layer by casting and the voids in the photoresist are formed by exposure of the photoresist through a patterned mask via X-rays or UV radiation.

Even though electrochemical fabrication as taught and practiced to date, has greatly enhanced the capabilities of microfabrication, and in particular added greatly to the number of metal layers that can be incorporated into a structure and to the speed and simplicity in which such structures can be made, room for enhancing the state of electrochemical fabrication exists.

SUMMARY OF THE INVENTION

It is an object of some embodiments of the invention to provide an improved method for deriving data necessary to define cross-sectional configurations of structures or groups of structures to be formed.

It is an object of some embodiments of the invention to provide simplified data manipulation techniques for defining cross-sectional data representing layers of structure that are to be formed.

Other objects and advantages of various embodiments of the invention will be apparent to those of skill in the art upon review of the teachings herein. The various embodiments of the invention, set forth explicitly herein or otherwise ascertained from the teachings herein, may address one or more of the above objects alone or in combination, or alternatively may address some other object of the invention ascertained from the teachings herein. It is not necessarily intended that all objects be addressed by any single aspect of the invention even though that may be the case with regard to some aspects.

In a first aspect of the invention, a process for forming a multilayer three-dimensional structure, includes: (a) providing data descriptive of the three-dimensional structure; (b) processing the data to derive cross-sectional data descriptive of a plurality of cross-sections of the three-dimensional structure; (c) processing the cross-sectional data to derive modified cross-sectional data including polygons, where each individual polygon encloses only a positive area; (d) using the modified cross-sectional data in a process for forming a patterned contact mask; (e) forming and adhering a layer of material to a substrate, wherein the substrate may include one or more previously deposited materials; (f) repeating the forming and adhering operation a plurality of times to build up a three-dimensional structure from a plurality of adhered layers, wherein the formation of at least one layer includes using the patterned contact mask to pattern the substrate or previously deposited material.

In a second aspect of the invention, a process for modifying a substrate, includes: (a) providing data descriptive of a modification to be made to a substrate; (b) processing the data to derive cross-sectional data descriptive of the modification of the substrate; (c) processing the cross-sectional data to derive modified cross-sectional data including polygons, where each individual polygon encloses only a positive area; (d) using the modified cross-sectional data in a process for forming a patterned contact mask; (e) modifying the substrate using the patterned contact mask.

In a third aspect of the invention, a process for forming a multilayer three-dimensional structure, includes: (a) providing cross-sectional data descriptive of a plurality of cross-sections of the three-dimensional structure; (c) processing the cross-sectional data to derive modified cross-sectional data including polygons, where each individual polygon encloses only a positive area; (d) using the modified cross-sectional data in a process for forming a patterned contact mask; (e) forming and adhering a layer of material to a substrate, wherein the substrate may include one or more previously deposited materials; (f) repeating the forming and adhering operation a plurality of times to build up a three-dimensional structure from a plurality of adhered layers, wherein the formation of at least one layer includes using the patterned contact mask to pattern the substrate or previously deposited material.

In a fourth aspect of the invention, a process for modifying a substrate, includes: (a) providing cross-sectional data descriptive of the modification of the substrate; (c) processing the cross-sectional data to derive modified cross-sectional data including polygons, where each individual polygon encloses only a positive area; (d) using the modified cross-sectional data in a process for forming a patterned contact mask; (e) modifying the substrate using the patterned contact mask.

Further aspects of the invention will be understood by those of skill in the art upon reviewing the teachings herein. Other aspects of the invention may involve apparatus that can be used in implementing one or more of the above method aspects of the invention. These other aspects of the invention may provide various combinations of the aspects, embodiments, and associated alternatives explicitly set forth herein as well as provide other configurations, structures, functional relationships, and processes that have not been specifically set forth above.

BRIEF DESCRIPTION OF THE DRAWINGS

FIGS. 2A-2F schematically depict side views of various stages of an electrochemical fabrication process as applied to the formation of a particular structure where a sacrificial material is selectively deposited while a structural material is blanket deposited.

FIG. 5 provides a block diagram of a process for forming a three-dimensional structure according to a first embodiment of the invention including the manipulation of data representing the structure to obtain data suitable for use in creating one or more photomasks that will be used in the fabrication of the structure.

FIG. 6 provides a block diagram detailing an exemplary set of operations that may be performed in completing the data manipulation operation of FIG. 5 including a cross-sectioning operation, an indicating operation, and a data production operation.

FIGS. 7A-7C provide block diagrams of three examples of how the operations of FIG. 6 may be supplemented by additional operations to allow photomasks to be produced which have patterning corresponding to a plurality of copies of the structure or structures to be formed.

FIG. 8 provides a block diagram showing two examples of how the indicating operation of FIG. 6 may be implemented.

FIGS. 14A-14B provide schematic illustrations of top views of a pair of structures which are to be duplicated multiple times in a mask that is to be produced and where the duplications may include one or more rotations, scaling variations, mirroring operations, complementing operations, and the like.

DETAILED DESCRIPTION OF PREFERRED EMBODIMENTS OF THE INVENTION

FIGS. 1A-1G, 2A-2F, and 3A-3C illustrate various features of one form of electrochemical fabrication that are known. Other electrochemical fabrication techniques are set forth in the '630 patent referenced above, in the various previously incorporated publications, in various other patents and patent applications incorporated herein by reference, still others may be derived from combinations of various approaches described in these publications, patents, and applications, or are otherwise known or ascertainable by those of skill in the art from the teachings set forth herein. All of these techniques may be combined with those of the various embodiments of various aspects of the invention to yield enhanced embodiments. Still other embodiments may be derived from combinations of the various embodiments explicitly set forth herein.

Figure 1A:
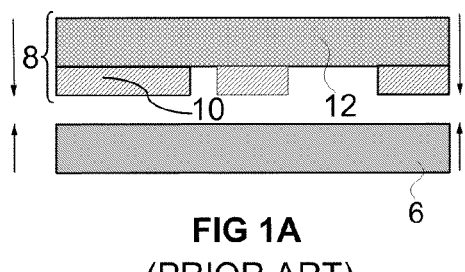
FIGS. 1A-1C schematically depict side views of various stages of a CC mask plating process, while FIGS. 1D-1G schematically depict a side views of various stages of a CC mask plating process using a different type of CC mask.
Figure 1B:
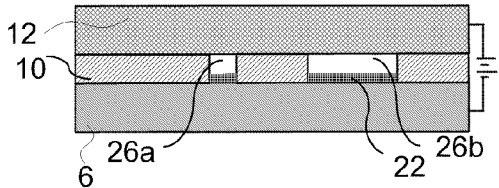
Figure 1C:
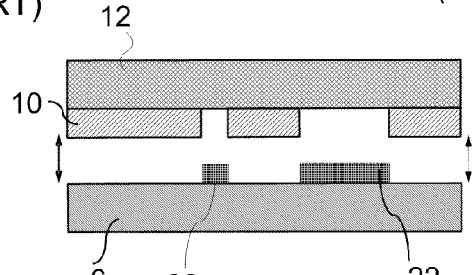
Figure 1D:
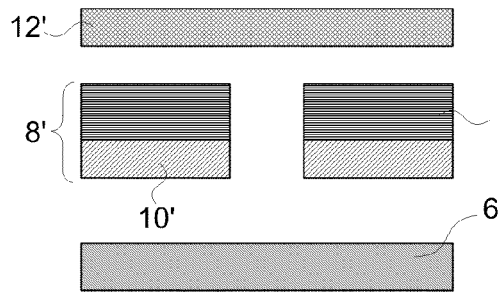
Figure 1E:
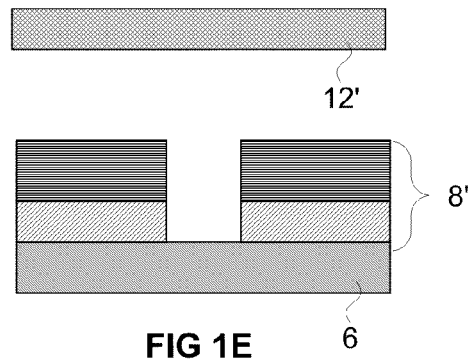
Figure 1F:
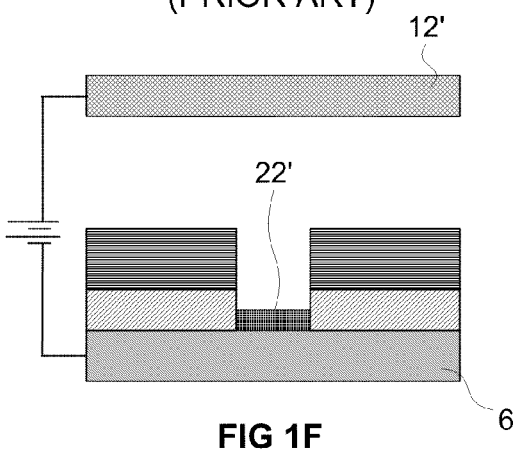
Figure 1G:
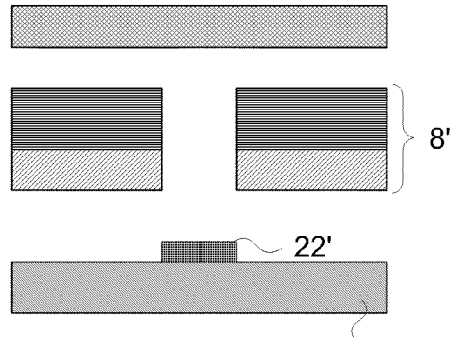
Figure 3A:
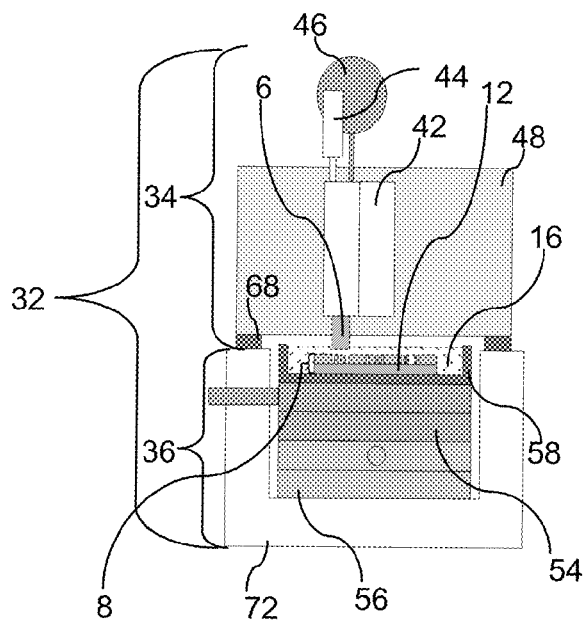
FIGS. 3A-3C schematically depict side views of various example subassemblies that may be used in manually implementing the electrochemical fabrication method depicted in FIGS. 2A-2F.
Figure 3B:
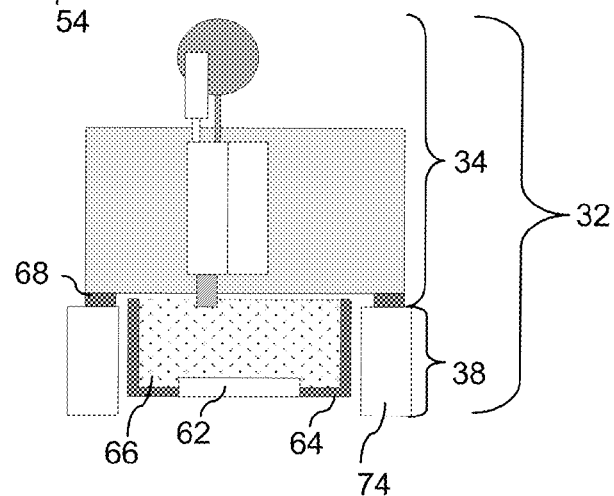
Figure 3C:
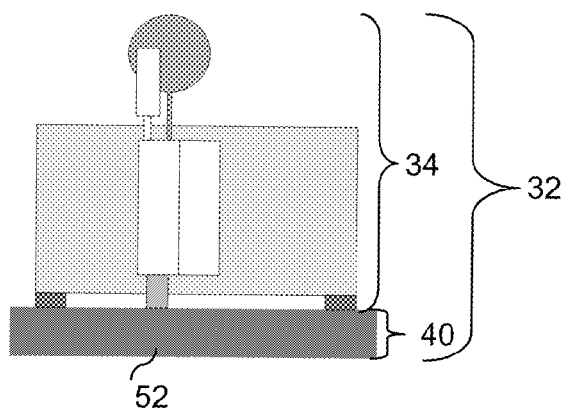
Figure 4A:
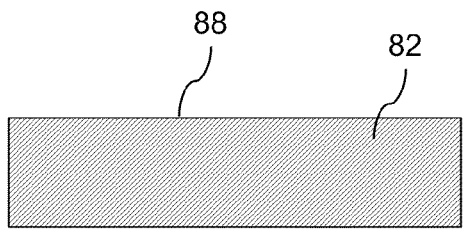
FIGS. 4A-4I schematically depict the formation of a first layer of a structure using adhered mask plating where the blanket deposition of a second material overlays both the openings between deposition locations of a first material and the first material itself.
Figure 4B:
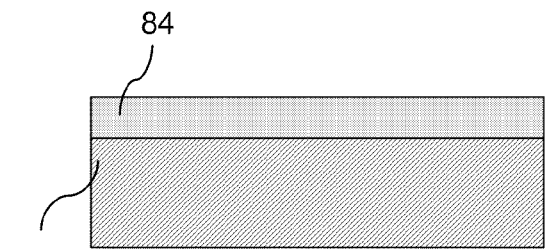
Figure 4C:
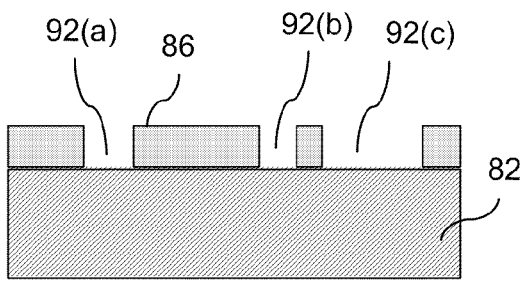
Figure 4D:
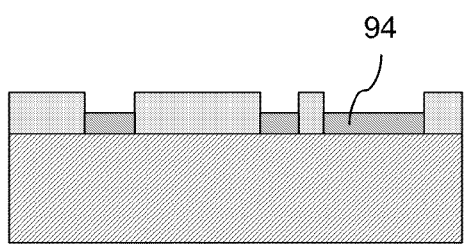
Figure 4E:
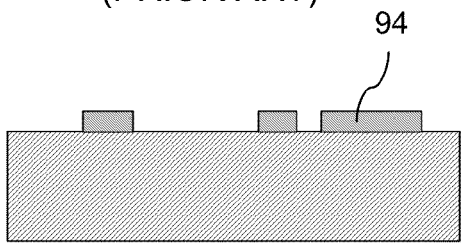
Figure 4F:
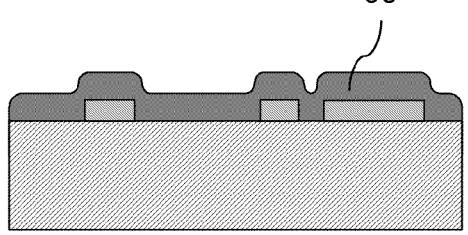
Figure 4G:
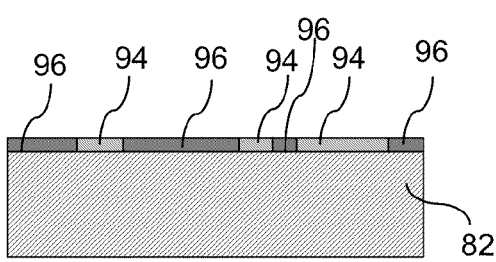
Figure 4H:
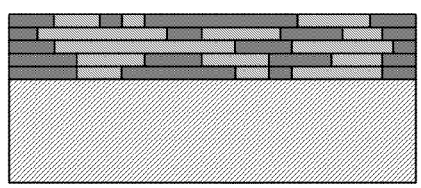
Figure 4I:
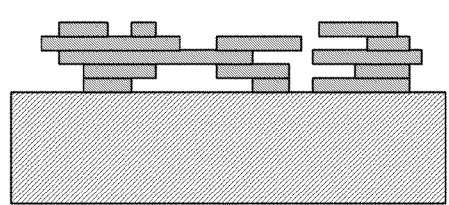

FIGS. 4A-4I illustrate various stages in the formation of a single layer of a multi-layer fabrication process where a second metal is deposited on a first metal as well as in openings in the first metal where its deposition forms part of the layer. In FIG. 4A, a side view of a substrate 82 is shown, onto which patternable photoresist 84 is cast as shown in FIG. 4B. In FIG. 4C, a pattern of resist is shown that results from the curing, exposing, and developing of the resist. The patterning of the photoresist 84 results in openings or apertures 92(a)-92(c) extending from a surface 86 of the photoresist through the thickness of the photoresist to surface 88 of the substrate 82. In FIG. 4D, a metal 94 (e.g. nickel) is shown as having been electroplated into the openings 92(a)-92(c). In FIG. 4E, the photoresist has been removed (i.e. chemically stripped) from the substrate to expose regions of the substrate 82 which are not covered with the first metal 94. In FIG. 4F, a second metal 96 (e.g., silver) is shown as having been blanket electroplated over the entire exposed portions of the substrate 82 (which is conductive) and over the first metal 94 (which is also conductive). FIG. 4G depicts the completed first layer of the structure which has resulted from the planarization of the first and second metals down to a height that exposes the first metal and sets a thickness for the first layer. In FIG. 4H the result of repeating the process steps shown in FIGS. 4B-4G several times to form a multi-layer structure are shown where each layer consists of two materials. For most applications, one of these materials is removed as shown in FIG. 4I to yield a desired 3-D structure 98 (e.g. component or device).

The various embodiments, alternatives, and techniques disclosed herein may form multi-layer structures using a single patterning technique on all layers or using different patterning techniques on different layers. For example, different types of patterning masks and masking techniques may be used or even techniques that perform direct selective depositions without the need for masking. For example, conformable contact masks may be used on some layers or in association with some selective depositions on some layers while non-conformable contact masks may be used in association with other depositions on the same layers or in association with depositions on other layers. Proximity masks and masking operations (i.e. operations that use masks that at least partially selectively shield a substrate by their proximity to the substrate even if contact is not made) may be used, and adhered masks and masking operations (masks and operations that use masks that are adhered to a substrate onto which selective deposition or etching is to occur as opposed to only being contacted to it) may be used.

In some embodiments of the invention, masks appropriate for selective depositions, etching operations, or other operations that pattern a substrate may be, for example, formed using a photomask through which a photopatternable material is exposed and/or via a direct exposure of a laser beam, or the like, which may be scanned (using relative motion), and possibly shuttered on and off, selectively onto desired portions of the photopatternable material. After exposure, if necessary, development of the photoresist may occur to yield the desired patterning.

Some embodiments of the invention are directed to techniques for electrochemically fabricating multi-layer three-dimensional structures where selective patterning of at least one or more layers occurs via use of a mask that was formed using data representing cross-sections of the three-dimensional structure which has been modified to place it in a polygonal form which defines only regions of positive area. The regions of positive area are regions where structural material is to be located or regions where structural material is not to be located depending on whether the mask will be used, for example, in selectively depositing a structural material or in selectively depositing a sacrificial material. The modified data may take the form of adjacent or slightly overlapped relatively narrow rectangular structures where the width of the structures is related to a desired formation resolution. The spacing between centers of adjacent rectangles may be uniform or may be a variable. The data modification may also include the formation of duplicate copies of an original structure, scaled copies, mirrored copies, rotated copies, complementary copies, and/or the like.

FIG. 5 provides a block diagram of a process for forming a three-dimensional structure according to a first embodiment of the invention including the manipulation of data representing the structure to obtain data suitable for use in creating one or more photomasks that will be used in the fabrication of the structure.

The block diagram of FIG. 5 begins with block 100 which calls for the conceiving of a three dimensional structure or plurality of structures that one would like to form. The structures may be of any scale; however, the most preferred embodiments of the invention are directed to the formation of mesoscale or microscale structures (e.g. parts, devices, components, or the like).

Block 110 of the process calls for the development of data that is descriptive of the structure or structures to be formed. This data may take a variety of forms, for example, it may be surface data descriptive of a three dimensional structure, cross sectional data descriptive of one or more layers making up the structure, or volumetric data defining the three dimensional structure or structures. Examples of such data can be found in U.S. Pat. No. 4,961,154 to Pomerantz et al. which is entitled "Three Dimensional Modeling Apparatus"; U.S. Pat. No. 5,184,307 to Hull et al. which is entitled "Method and Apparatus for Production of High Resolution Three Dimensional Objects by Stereolithography"; and U.S. Pat. No. 5,321,622 to Snead et al. which is entitled "Boolean Layer Comparison Slice". These patents are hereby incorporated herein by reference as if set forth in full.

Block 120 calls for the manipulation of the supplied data so as to obtain data suitable for generating one or more photomasks which are descriptive of at least portions of one or more cross-sections of the structure or structures to be formed. The manipulated data may provide modified definitions of solid and empty regions based on a number of factors. These factors include, for example, the type of photopatternable material that will be used, whether or not the mask that will be produced is intended to produce structural regions (i.e. regions of solid) or sacrificial regions (i.e. hollow regions), whether or not some form of boundary position offsetting will be used (e.g. to accommodate for various offsets or shifts in boundary positions that may result from the processes used to create the structure or used to create the mask), whether or not any scaling of the size of the structure will occur, whether or not any mirroring of structural features will occur, whether or not the complimenting of the data will occur for reasons other then those noted above, and whether or not the offset between adjacent raster or hatch lines will be of a fixed value or will be a variable.

If the photopatternable material is a photoresist of the negative type the photoresist will become insoluble in those regions where light sufficiently exposes it whereas if it is of the positive type it will become selectively soluble in certain solvents in regions where light has exposed it. Thus depending upon the type of photoresist chosen, the data used to define the exposed regions may need to vary. If on the other hand a contact mask is being made, depending upon the type of process being used (e.g. in one of the processes disclosed in U.S. Pat. No. 6,027,630 as discussed herein above), it may be necessary for the regions defined by the data to be complemented, size shifted, or otherwise adjusted.

Turning back to FIG. 5, block 130 calls for the generation of one or more photomasks based at least in part on the manipulated data derived in block 120.

Block 140 calls for the patterning of a masking material (e.g. that will be used to directly pattern material forming part of the layers of the structure) using the at least one photomask.

Block 150 calls for the formation of a layer of the structure from one or more desired materials using patterned masking material obtained in block 140 where the patterned masking material is used in selectively depositing a building material (e.g. a structural material or a sacrificial material) and/or to modify a substrate or previously deposited material.

Block 160 calls for the formation of any additional layers that are required to build the structure while block 170 calls for the performance of any necessary post layer formation processes (i.e. post processing operations) to complete formation of the three dimensional structure or structures.

FIG. 6 provides a block diagram detailing an exemplary set of operations that may be performed in completing the data manipulation operation of FIG. 5 including a cross-sectioning operation, an indicating operation, and a data production operation.

The data manipulation process of FIG. 6 begins with the operation of block 222 which calls for the receiving of three-dimensional data descriptive of the structure or structures to be formed. The received data is then manipulated by the operation of block 232 which calls for the derivation of one or more levels of cross-sectional data based at least in part on the data descriptive of the three-dimensional structure.

Block 242 calls for defining how each region of the cross-sectional data will be used in producing the final manipulated data that will be used in generating each photomask associated with a given data level or cross-sectional level.

Block 252 calls for the production of a data set which includes boundary descriptions of one or more polygonal geometries that will be used in generating a photomask. Each of the polygonal geometries is descriptive of a positive area or a negative area and the same selection of positive or negative area is made for each polygon.

In one embodiment of the invention, for example, the polygons are rectangular structures which are oriented along a series of closely spaced raster or vector lines and where the width of each rectangle is selected to provide complete coverage of the region located between consecutive raster lines that is intended to be controlled or covered by the polygon (e.g. the width is set to be equal to the spacing between the raster lines or somewhat larger then the spacing between raster lines).

FIGS. 7A-7C provide block diagrams of three examples of how the operations of FIG. 6 may be supplemented by additional operations to allow photomasks to be produced which have patterning corresponding to a plurality of copies of the structure or structures to be formed.

FIG. 7A introduces an additional operation between operations 222 and 232 of FIG. 6. This additional operation 224 calls for the making of copies of the three-dimensional data corresponding to any duplicates of the 3-D structure that are to be simultaneously formed.

FIG. 7B, on the other hand, calls for the inclusion of an additional operation 234-1 between operations 232 and 242 of FIG. 6. Operation 234-1 calls for the making of a copy of the cross-sectional data for each duplicate of the structure that is to be included on the photomask.

FIG. 7C calls for the introduction of an operation 234-2 between operations 232 and 242 of FIG. 6. Operation 234-2 calls for the providing of offsets and links to cross sectional data for any structure or structures that are to be duplicated as opposed to making a duplicate of the entire data set of the structure or structures for each copy to be produced. It is intended that the link and offset information reduce the amount of data storage required and computational effort necessary to produce the data sets called for in block 252.

In alternative embodiments the copies and or offsets and links of FIGS. 7A-7C may alternatively, or additionally, include variations in the copies or additional parameters in the links and offsets so as to call for variations of the original structure or structures to be produced. As noted previously such variations may include scaling, boundary offsetting, mirroring, complementing, and/or the like.

FIG. 8 provides a block diagram showing two examples of how the indicating operation of FIG. 6 may be implemented.

Block 242-1 of FIG. 8 provides a first example implementation of operation 242 of FIG. 6. It calls for the regions outside of the positive area boundaries to be non-data producing regions. In other words, the positive areas are the areas which will give rise to polygons that will be included in the data set produced by operation 252.

Block 242-2 calls for the regions outside the positive area boundaries to be data producing and regions within the positive boundaries to be non-data producing. In other words, the polygons produced in the operation of block 252 will include mask regions that are exclusive of regions defined by the positive boundaries of the cross-sectional data of block 232. In other alternative embodiments, it may be possible to provide other definitions of how positive and/or negative areas should be handled. For example, in embodiments where more then two complimentary materials will be used during the formation of a structure or structures, the definitions may be based upon material type as well as upon whether a boundary defines a positive or negative region.

Figure 9:
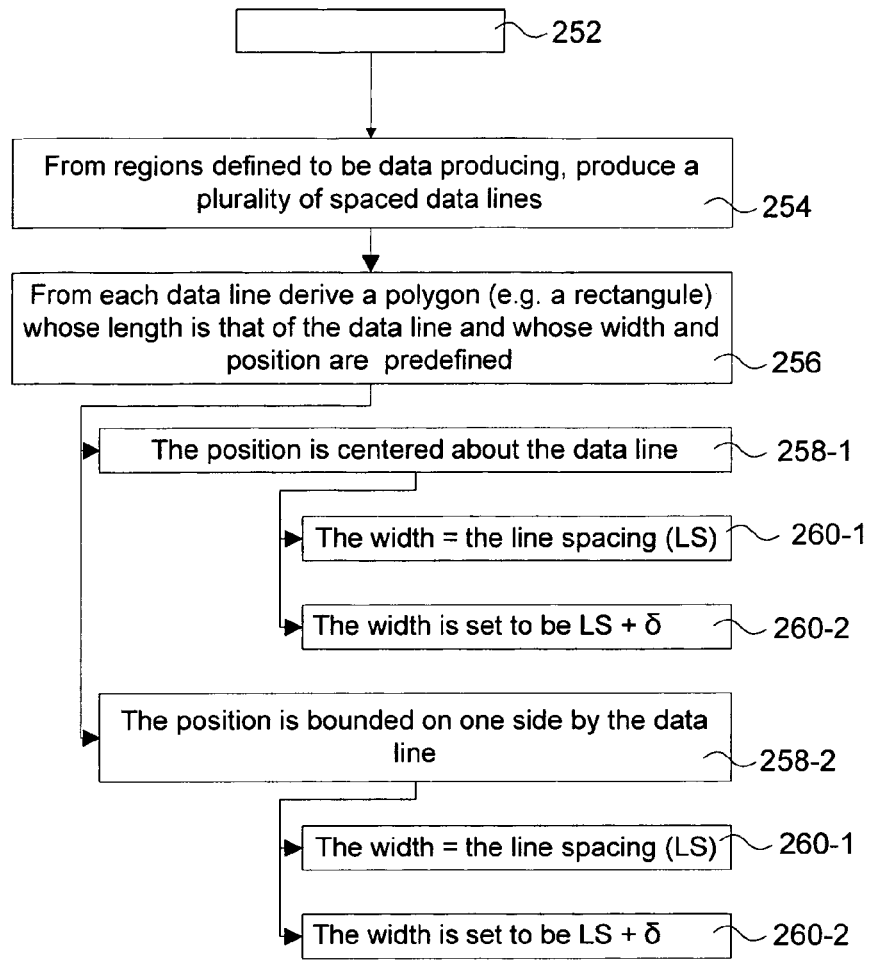
FIG. 9 provides a block diagram showing an example of how the data production operation of FIG. 6 may be implemented along with two example alternatives on how polygon boundaries may relate to the data lines from which they are derived.

FIG. 9 provides a block diagram showing an example of how the data production operation of block 252 of FIG. 6 may be implemented along with two example alternatives on how polygon boundaries may be related to the data lines from which they are derived in this example.

The data production operation of block 252 may be implemented by first deriving a plurality of spaced data lines located within the regions that are defined to be data producing as called for by block 254 of FIG. 9. These spaced data lines may be called hatch lines, fill lines, raster lines, or the like and are located within in the data producing regions. These lines may be derived conceptually from the overlaying of the data producing regions onto a predefined grid of hatch paths, fill paths, or raster paths (i.e. locations capable of producing lines to the extent they are located within data producing regions) or alternatively locations of the paths may be defined in a more geometry sensitive manner. Such sensitivity may result in the spacing of paths being reduced or increased based on an intercept angle between approximate path locations and one or both of the boundaries of the data producing regions.

In alternative embodiments, the orientation of hatch paths may be varied from cross-section to cross-section or even from cross-sectional region to cross-sectional region, for example, in order to minimize any negative effects that quantization resulting from the use of raster lines in generating rectangular polygons (i.e. pseudo-raster polygons or simply pseudo-rasters). Various methods for producing the spaced data lines are taught in U.S. Pat. Nos. 5,184,306 and 5,321, 622 which have been discussed above and which are incorporated herein by reference.

Block 256 calls for the conversion of each spaced data line into a polygon whose length is defined by the length of the data line itself and whose width and position may be defined in different ways. For example, as indicated in block 258-1 the position of the polygon may be centered about the data line while the width of the polygon may be equal to that of the spacing between the data lines (block 260-1) or it may be equal to the spacing between the data lines plus an incremental amount (block 260-2). Alternatively as indicated in block 258-2 the position may be bounded on one side by the data line that gives rise to the polygon while the width is set to that of the line spacing (block 260-1) or is set to the line spacing plus an incremental amount (260-2). In alternative embodiments, it may be possible to use polygons that are not rectangles. For example, it may be possible to use trapezoids. In other alternative embodiments, it may be possible to reduce the quantity of pseudoraster data by merging smaller rectangles together so as to produce larger rectangles or even more complex polygonal shapes. Such merging may occur, for example, when two or more adjacent pseudo raster rectangles have common end points.

In still other embodiments each polygon may be derived from data lines or portions of data lines located on two consecutive hatch paths where the end segments of the polygons are generated from an appropriate bridging of the data lines. In the simplest of cases, the bridging of the data lines may produce polygon boundary lines from lines that connect the hatch lines endpoint to endpoint or beginning point to beginning point. In other cases, it may be desirable to use information concerning common positioning of the data lines in determining whether or not bridging should occur. In still other cases it may be desirable to consider whether or not multiple lines exist on one hatch path that overlay positions occupied by a single hatch line on an adjacent hatch path. In still other embodiments, it may be desirable to base the positioning of ambiguous bridging elements based on continuity of bridging element slope from one or more adjacent pairs of data lines.

Figure 10:
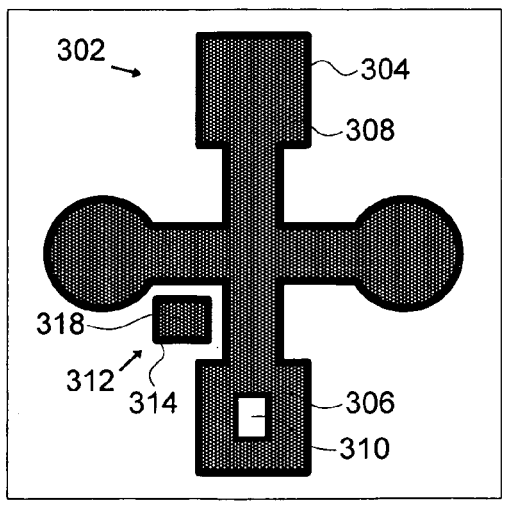
FIG. 10 provides a schematic illustration of a top view of an example cross-sectional configuration of two three-dimensional structures that are to be formed.

FIG. 10 provides a schematic illustration of a top view of an example cross-sectional configuration of two three-dimensional structures that are to be formed.

The sample cross-section shown in FIG. 10 includes a first structure 302 having two boundary elements 304 and 306 which define a region of structure 308 and a hollow region or empty region 310. Structure 312 includes a boundary region 314 and a region of structure 318.

FIGS. 11A-11D provide schematic illustrations of top views of various stages of the process of FIG. 9 where the regions defined to be data producing are those that are occupied by structure to be formed.

Figure 11A:
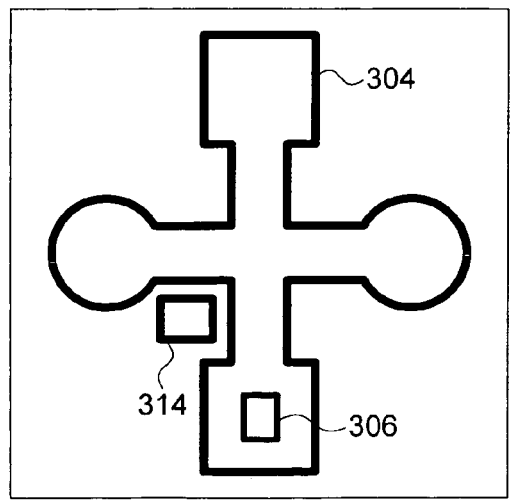
FIGS. 11A-11D provide schematic illustrations of top views of various stages of the process of FIG. 9 where the regions defined to include positive areas are those that are occupied by structure to be formed.

FIG. 11A depicts a state of the process after boundary regions 304, 306, and 314 have been created. Boundary 304 defines a positive area with the exception of the region occupied by boundary 306 which defines a negative area. Boundary 314 also defines a positive area.

Figure 11B:
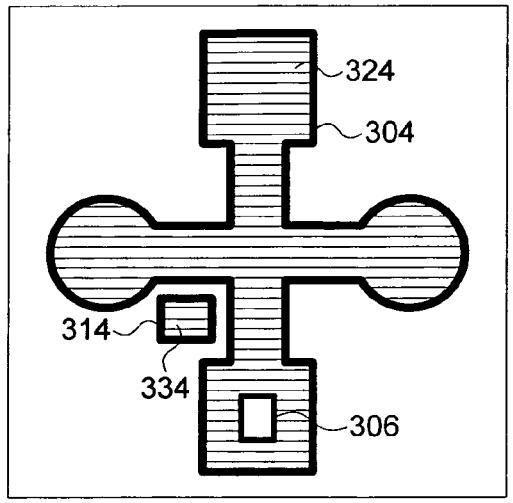

FIG. 11B depicts a state of the process after raster lines 324 have been made to occupy a region defined by the Boolean difference between boundaries 304 and 306 and hatch lines 334 have been made to occupy boundary 314.

Figure 11C:
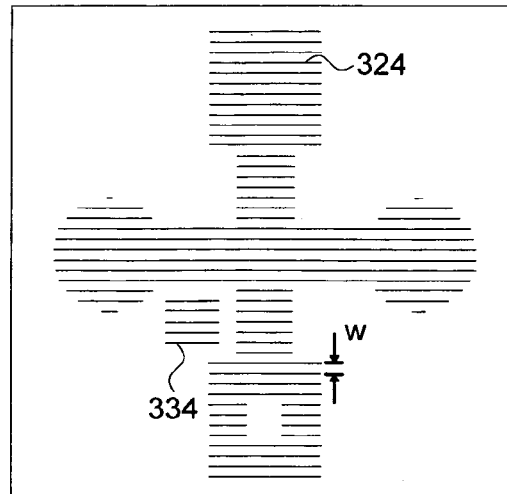

FIG. 11C depicts the state of the process where only the hatch lines or raster lines are shown.

Figure 11D:
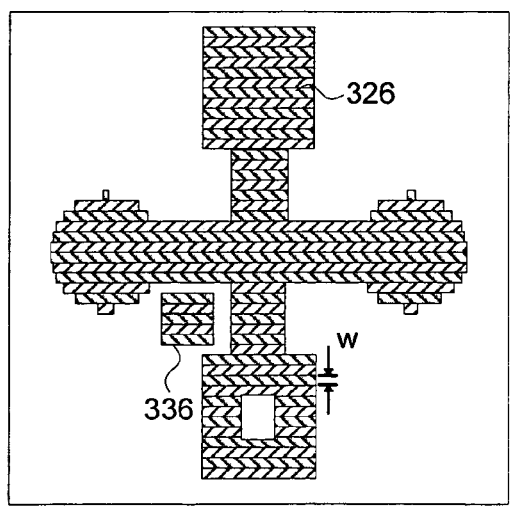

FIG. 11D depicts a state of the process after hatch or raster lines 324 and 334 have been converted to rectangular polygons 326 and 336. The length of each polygon corresponds to the length of the hatch or raster line which gave rise to it while the width, w, of the polygons correspond to the spacing, w, between adjacent hatch paths or raster paths. To distinguish the separate polygons, adjacent polygons have been depicted with alternating fill patterns.

Figure 12:
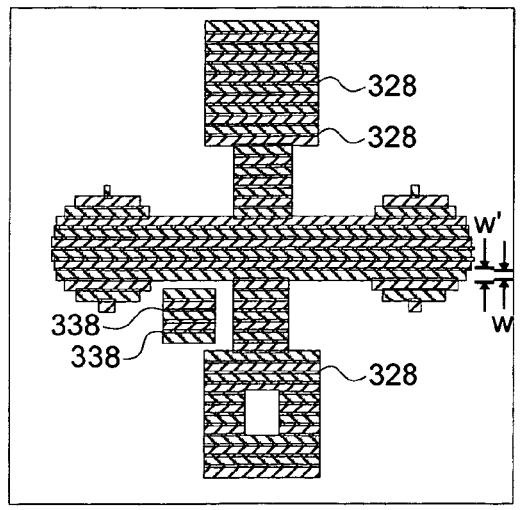
FIG. 12 provides a schematic illustration of a top view of the structure of FIG. 11A where the polygons are shown as having a width that is somewhat larger than the spacing between successive polygons.

FIG. 12 provides a schematic illustration of a top view of the structure of FIG. 11A where the polygons are shown as having a width that is somewhat larger than the spacing between successive polygons. FIG. 12 depicts transition regions 328 and 338 that are located at the boundaries separating adjacent polygons. These transition regions are actually regions of overlap between adjacent polygons which result from the width of each polygon, w', being greater then the separation, w, between consecutive raster paths.

FIGS. 13A-13D provide schematic illustrations of top views of various stages of the process of FIG. 9 where the regions defined to include positive areas are those that are outside the regions to be occupied by structure to be formed.

FIGS. 13A-13D depict complementary patterns as compared to those of FIGS. 10, 11B, 11C and 11D respectively. Boundaries 404, 406, and 414 are similar to boundaries 304, 306 and 314 with the exception that they are defined to enclose areas of opposite sign.

Figure 13A:
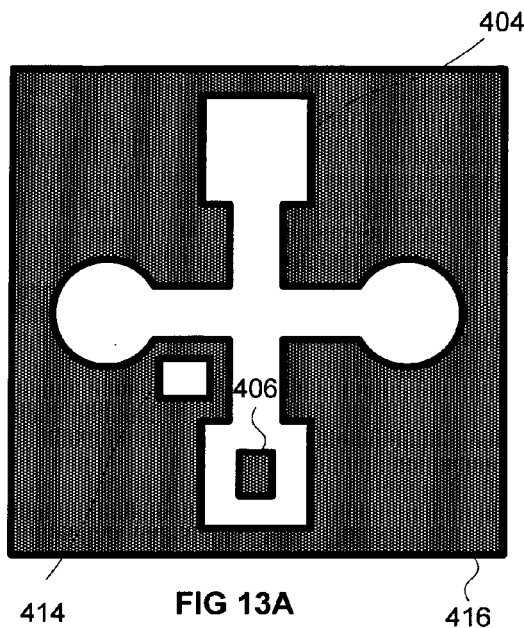
FIGS. 13A-13D provide schematic illustrations of top views of various stages of the process of FIG. 9 where the regions defined to include positive areas are those that are outside the regions to be occupied by structure to be formed.

FIG. 13A also depicts the conceptual existence of a fourth boundary 416 which encloses the effective build area or area of the photomask. Boundary 416 is considered to define a positive area.

Figure 13B:
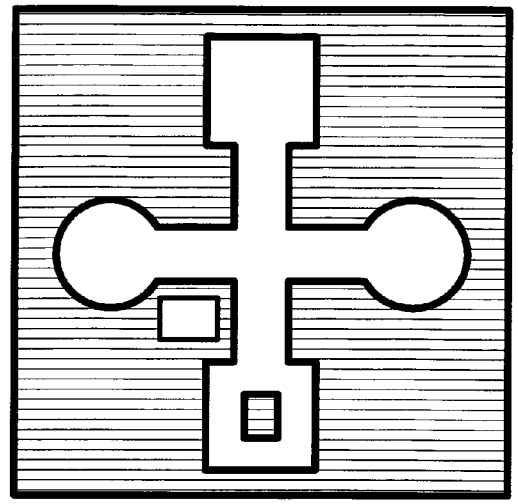
Figure 13C:
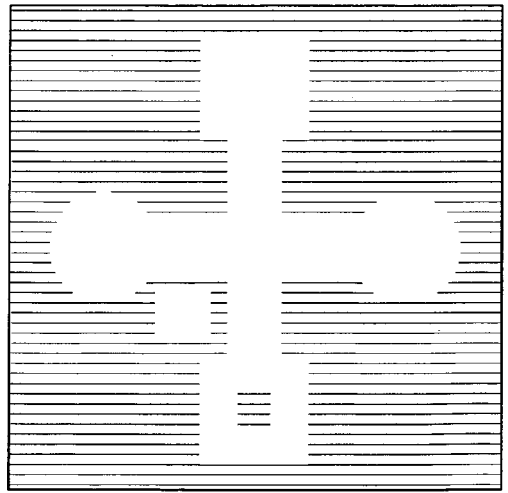

FIG. 13B depicts a state of the process after hatch or raster paths have given rise to hatch or raster lines in the regions of positive area (i.e. regions defined to be data producing). A comparison of FIGS. 13B and 11B indicate that the reversed definitions of areas defined by each boundary type and inclusion of a global boundary 416 have resulted in FIG. 13B producing a complementary pattern of hatch lines to those of FIG. 11B. The complementary pattern of hatch lines is shown more clearly in FIG. 13C as boundaries have been removed.

Figure 13D:
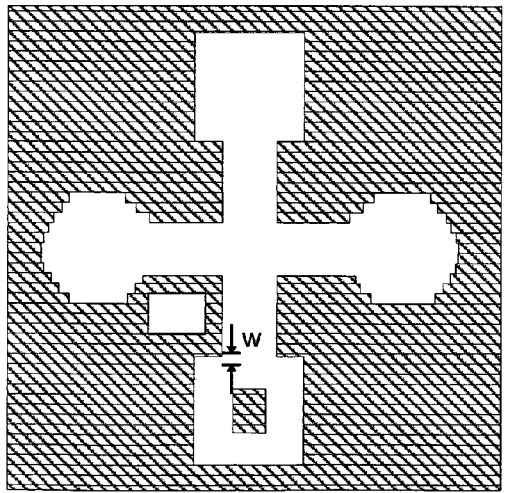

FIG. 13D depicts a state of the process after hatch lines have been converted to a polygon or pseudo-raster volumes where the length of the polygons is based on the length of the hatch lines that gave rise to them and the width of the polygons is set to be equal to the width, w, of the spacing between hatch paths.

Figure 14A:
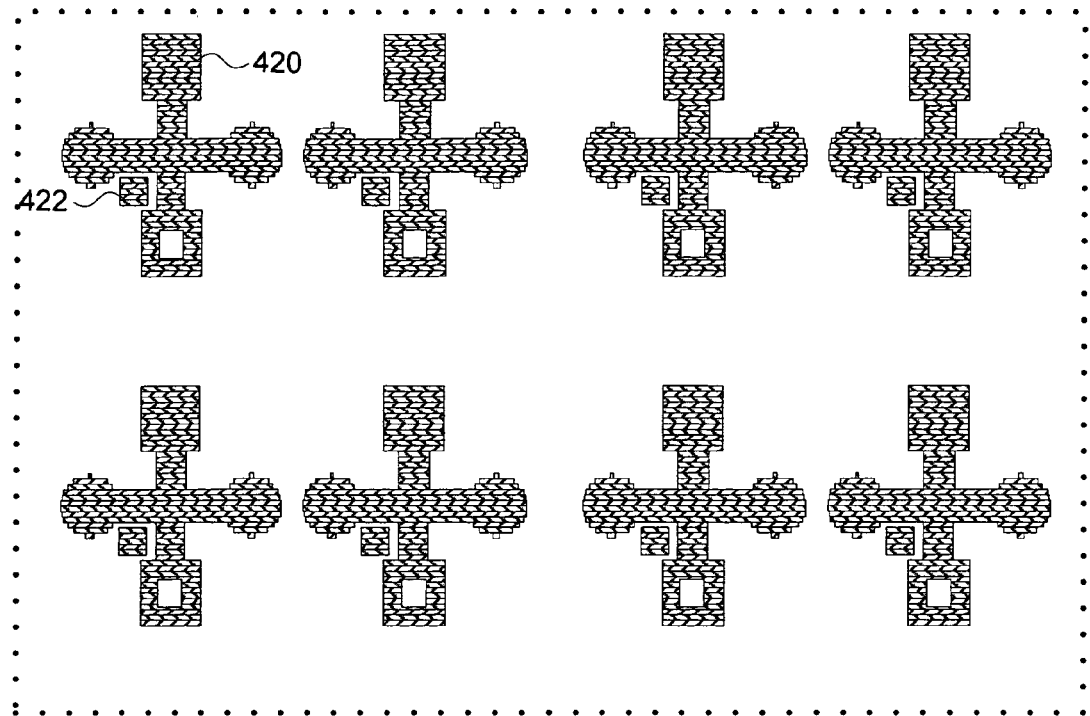
Figure 14B:
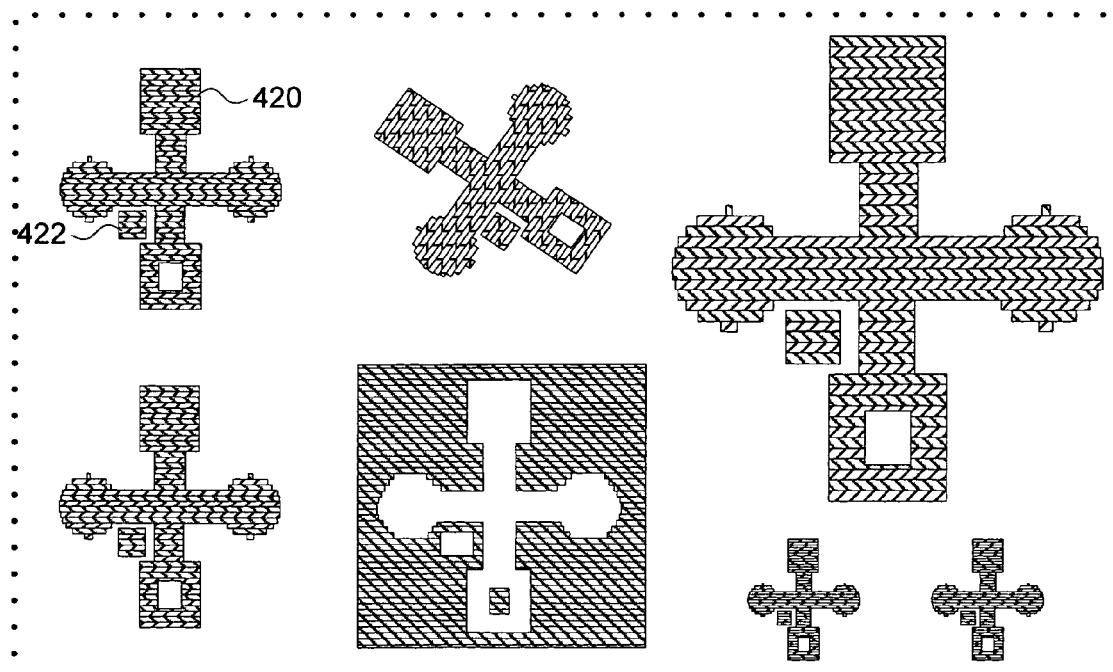

FIGS. 14A-14B provide schematic illustrations of top views of a pair of structures which are to be duplicated multiple times in a mask that is to be produced, where the duplications may include one or more of rotations, scaling variations, mirroring operations, complementing operations, and the like.

FIG. 14A graphically depicts the contents of a data file that may be used in producing a photomask. The data file includes structures 420 and 422 defined by a plurality of pseudo-rasters for structures 420 and 422 and for a plurality of duplicates of them. The data provides for production of a photomask that represents an array of structures. The photomask may in turn be used to produce a patterning mask which can give rise to an array of structures during build operations.

FIG. 14B depicts an alternative data set where structures 420 and 422 have been duplicated, scaled, mirrored and rotated and complemented, so as to give rise to a data set that may be used to produce a photomask with a plurality of different configurations of a basic structure or structures that may be used in forming the plurality of different structures simultaneously in a single build process.

Figure 15:
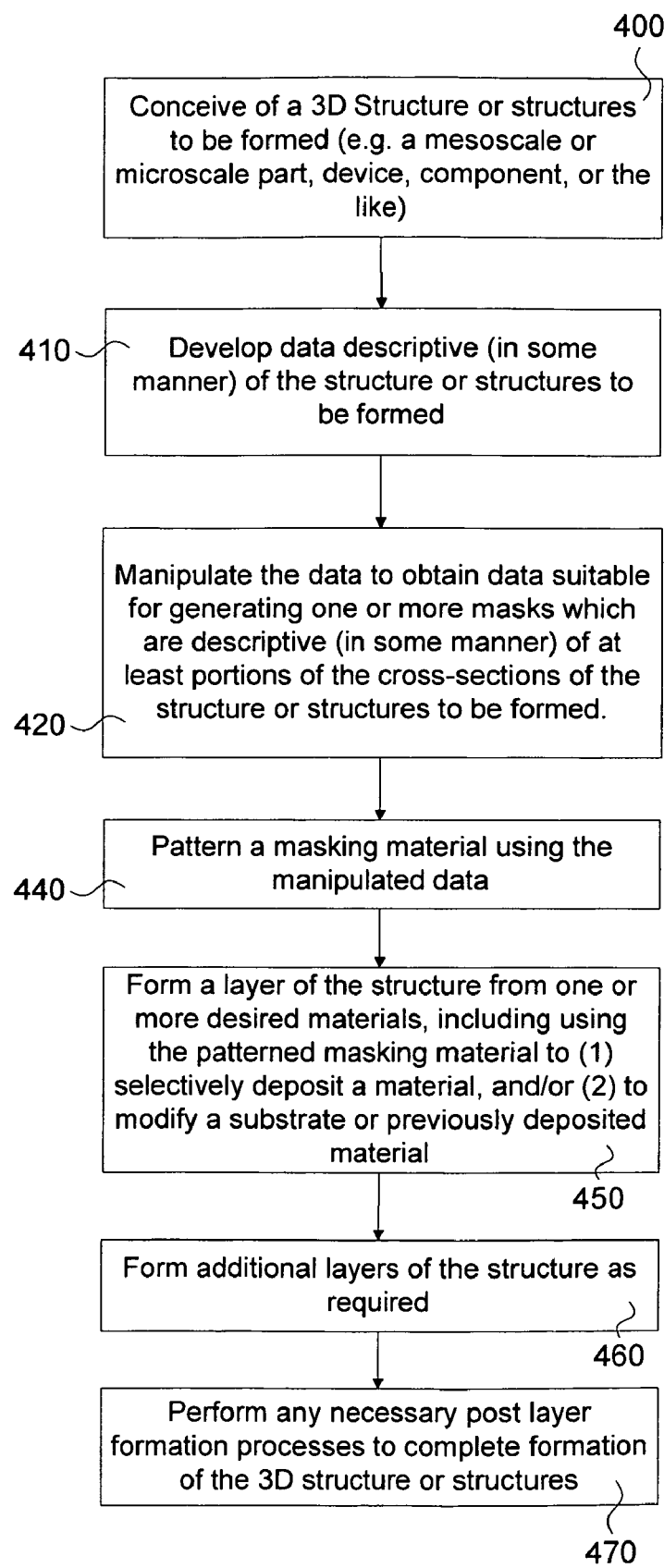
FIG. 15 provides a block diagram of a process for forming a three-dimensional structure according to a second embodiment of the invention including the manipulation of data representing the structure to obtain data suitable for use in creating one or more masks that may be used in selectively patterning a substrate or previously deposited material during the fabrication of the structure.

FIG. 15 provides a block diagram of a process for forming a three-dimensional structure according to a second embodiment of the invention including the manipulation of data representing the structure to obtain data suitable for use in creating one or more masks that may be used in selectively patterning a substrate or previously deposited material during the fabrication of the structure.

The process of FIG. 15 is similar to that depicted in FIG. 5 with the exception that the process of FIG. 15 does not produce data that is used to produce a photomask but instead uses the produced data to pattern a masking material that will be directly used in patterning a substrate or depositing a material thereto. The direct patterning of a masking material may occur, for example, by selective scanning of a laser beam over the surface of the masking material wherein different scanning speeds may be used to obtain different levels of exposure or where the intensity of the laser beam striking the surface may be modulated on and off depending on whether the beam is directed to a location where exposure is to occur. The exposure from the laser beam may result in the formation of a latent pattern which can be brought out by developing the material (e.g. a photoresist material) or alternatively the exposure may result in the ablation of material.

Other direct patterning techniques might involve the selective deposition of patterning material onto the surface of the substrate or previously formed layer, for example, by controlled ink jet dispensing or the like. The operations of blocks 400, 410 and 420 are similar to the operations of blocks 100, 110, and 120.

Block 440 calls for the patterning of a masking material using the manipulated data.

Blocks 450, 460, and 470 call for similar operations to those set forth in blocks 150, 160 and 170.

Various other embodiments of the present invention exist. Some of these embodiments may be based on a combination of the teachings herein with various teachings incorporated herein by reference. Some embodiments may not use any blanket deposition process and/or they may not use a planarization process. Some embodiments may involve the selective deposition of a plurality of different materials on a single layer or on different layers. Some embodiments may use selective deposition processes or blanket deposition processes on some or all layers that are not electrodeposition processes. Some embodiments may use nickel as a structural material while other embodiments may use different materials. Some embodiments may use copper as the structural material with or without a sacrificial material. Some embodiments may remove a sacrificial material while other embodiments may not. In some embodiments the anode (used during electrodeposition) may be different from a conformable contact mask support and the support may be a porous structure or other perforated structure. Some embodiments may produce structures that include both conductive materials and dielectric materials.

Some embodiments may produce pseudo raster data representing regions that are different from cross-sectional regions or selected material regions associated with specific cross-sections. Some processes may employ mask based selective etching operations in conjunction with blanket deposition operations. In such processes, pseudo-rasters(may be generated based on desired etching patterns or patterns of mask openings that will be used in association with such etching operations. Some embodiments may form structures on a layer-by-layer basis but may deviate from a strict planar layer by planar layer build up process in favor of a process that interlacing material deposited in association with different layers. Such alternative build processes are disclosed in U.S. application Ser. No. 10/434,519, filed on May 7, 2003, entitled Methods of and Apparatus for Electrochemically Fabricating Structures Via Interlaced Layers or Via Selective Etching and Filling of Voids. This application is hereby incorporated herein by reference as if set forth in full.

In view of the teachings herein, many further embodiments, alternatives in design and uses of the invention will be apparent to those of skill in the art. As such, it is not intended that the invention be limited to the particular illustrative embodiments, alternatives, and uses described above but instead that it be solely limited by the claims presented hereafter.

We claim:

1. A process for forming a multilayer three-dimensional structure, comprising:
   (a) providing data descriptive of the three-dimensional structure;
   (b) processing the data to derive cross-sectional data descriptive of a plurality of cross-sections of the three-dimensional structure;
   (c) processing the cross-sectional data to derive modified cross-sectional data comprising polygons, where each individual polygon encloses only a positive area and the modified cross-sectional data for each cross-section comprises by a plurality of such polygons;
   (d) using the modified cross-sectional data in a process for forming a patterned contact mask;
   (e) forming and adhering a layer of material to a substrate;
   (f) repeating the forming and adhering operation a plurality of times to build up a three-dimensional structure from a plurality of adhered layers, wherein each successive layer is adhered to a previously formed layer,
   wherein the formation of at least one layer comprises using the patterned contact mask to pattern a surface of the substrate or of a previously deposited material.

2. The process of claim 1 wherein the patterning of a surface of the substrate or of the previously deposited material comprises selectively depositing material thereon.

3. The process of claim 1 wherein the patterning of a surface of the substrate or of the previously deposited material comprises selective etching a void into the substrate or into the previously deposited material.

4. The process of claim 1 wherein the processing of the cross-sectional data, for each cross-section, comprises deriving a plurality of adjoining rectangular structures.

5. The process of claim 4 wherein the rectangular structures are laid out with their lengths extending along a series of parallel lines.

6. The process of claim 5 wherein the parallel lines are spaced from consecutive lines by a width and a width of the rectangles is equal to the width between the consecutive lines.

7. The process of claim 5 wherein the parallel lines are spaced from consecutive lines by a width and a width of the rectangles is greater than the width between the consecutive lines.

8. The process of claim 5 wherein the parallel lines are spaced from consecutive lines by a width and a width of the rectangles is less than the width between the consecutive lines.

9. The process of claim 5 wherein the parallel lines are spaced from consecutive lines by a width which is a variable.

10. The process of claim 9 wherein the variable width is automatically selected by a predefined algorithm which is at least in part based on an angle of contact between a boundary line and a line collinear with a length of the rectangle.

11. The process of claim 1 wherein the polygons define regions where material forming part of the structure is to be located.

12. The process of claim 1 wherein the polygons define regions where material forming part of the structure is not to be located.

13. The process of claim 1 wherein the polygons define regions which have been boundary compensated.

14. The process of claim 1 wherein the mask defines multiple copies of the structure to be formed.

15. The process of claim 14 wherein a least one of the multiple copies is scaled to have a size that is different from a size of at least one other copy of the structure.

16. The process of claim 14 wherein a least one of the multiple copies is rotated relative to an orientation of at least one other copy of the structure.

17. The process of claim 14 wherein a least one of the multiple copies is mirrored about an axis relative to a configuration of at least one other copy of the structure.

18. The process of claim 14 wherein a least one of the multiple copies is a mirrored boundary compensated version of the structure.

19. The process of claim 14 wherein a least one of the multiple copies is defined as a complementary pattern selected from the group consisting of: (1) a cross-section of the structure to be formed, (2) a scaled version of a cross-section of the structure, (3) a mirrored version of a cross-section of the structure, or (4) a boundary compensated version of the structure.

20. The process of claim 1 wherein the using of the modified cross-sectional data comprises using the modified data to produce at least one photomask that is used in a process for forming a patterned contact mask.

21. The process of claim 1 wherein the using of the modified cross-sectional data comprises using the modified data to control a relative motion of a scanning laser beam and a mask material to form a patterned contact mask.

22. A process for forming a multilayer three-dimensional structure, comprising:
   (a) providing cross-sectional data descriptive of a plurality of cross-sections of the three-dimensional structure;
   (c) processing the cross-sectional data to derive modified cross-sectional data comprising polygons, where each individual polygon encloses only a positive area, and the modified cross-sectional data for each cross-section comprises by a plurality of such polygons;
   (d) using the modified cross-sectional data in a process for forming a patterned contact mask;
   (e) forming and adhering a layer of material to a substrate;
   (f) repeating the forming and adhering operation a plurality of times to build up a three-dimensional structure from a plurality of adhered layers, wherein each successive layer formed is adhered a previously formed layer, and
   wherein the formation of at least one layer comprises using the patterned contact mask to pattern the surface of the substrate or of a previously deposited material.

* * * * *